US008965910B2

(12) United States Patent
Seo et al.

(10) Patent No.: US 8,965,910 B2
(45) Date of Patent: *Feb. 24, 2015

(54) APPARATUS AND METHOD OF SEARCHING FOR INSTANCE PATH BASED ON ONTOLOGY SCHEMA

(75) Inventors: Dong Min Seo, Daejeon (KR); Han Min Jung, Daejeon (KR); Pyung Kim, Daejeon (KR); Mi Kyoung Lee, Daejeon (KR); Seung Woo Lee, Daejeon (KR); Won Kyung Sung, Daejeon (KR)

(73) Assignee: Korea Institute of Science and Technology Information, Daejeon (KR)

( * ) Notice: Subject to any disclaimer, the term of this patent is extended or adjusted under 35 U.S.C. 154(b) by 205 days.

This patent is subject to a terminal disclaimer.

(21) Appl. No.: 13/474,002

(22) Filed: May 17, 2012

(65) Prior Publication Data

US 2012/0310919 A1    Dec. 6, 2012

(30) Foreign Application Priority Data

Jun. 3, 2011    (KR) .................... 10-2011-0054015

(51) Int. Cl.
G06F 17/30        (2006.01)
(52) U.S. Cl.
CPC ............................ G06F 17/30513 (2013.01)
USPC ........................................................ 707/758
(58) Field of Classification Search
CPC .............. G06F 17/30734; G06F 17/30292; G06F 17/30297; G06F 17/306001; G06F 17/3071; G06F 17/30392
USPC ................... 707/758, 706, 707, 714
See application file for complete search history.

(56) References Cited

U.S. PATENT DOCUMENTS

| 7,533,122 | B2 * | 5/2009 | Drumm et al. ........................ 1/1 |
| 7,558,791 | B2 * | 7/2009 | Wahl ..................................... 1/1 |
| 7,809,672 | B1 * | 10/2010 | Tenorio ...................... 705/26.64 |
| 7,877,421 | B2 * | 1/2011 | Berger et al. .................. 707/809 |
| 7,921,098 | B2 * | 4/2011 | Edelstein et al. ............. 707/708 |
| 2006/0053172 | A1 * | 3/2006 | Gardner et al. ............... 707/203 |
| 2008/0071731 | A1 * | 3/2008 | Ma et al. ........................... 707/2 |

FOREIGN PATENT DOCUMENTS

KR         10-0842263 B1    6/2008
KR    10-2010-0077923 A     7/2010

OTHER PUBLICATIONS

Heim et al. RelFinder:Revealing Relationships in RDF Knowledge Bases, 2009, pp. 182-187.*

(Continued)

*Primary Examiner* — Ajay Bhatia
*Assistant Examiner* — Fatima Mina
(74) *Attorney, Agent, or Firm* — LRK Patent Law Firm

(57) ABSTRACT

An apparatus and method of searching for an instance path based on an ontology schema are provided. The method of searching for an instance path based on an ontology schema, which is performed by an instance path search apparatus, includes (a) receiving two or more keywords from a user and generating a pair of instances with respect to the keywords, respectively, (b) extracting a pair of classes corresponding to each of the pairs of instances from an ontology instance database, respectively, (c) obtaining an ontology schema path with respect to each of the pairs of classes from an ontology schema path database, respectively, and (d) replacing start and end classes with corresponding first and second instances in each of the ontology schema paths and searching for an instance path connected between the first instance and the second instance, respectively.

17 Claims, 22 Drawing Sheets

(56) References Cited

OTHER PUBLICATIONS

European Search Report for European Application No. 12168705.7.
Philipp Heim et al., "Interactive Relationship Discovery via the Semantic Web", May 30, 2010, The Semantic Web: Research and Applications, Springer Berlin Heidelberg, Berlin, Heidelberg, pp. 303-317, XP019143483, ISBN: 978-3-642-13485-2.
Philipp Heim et al., "RelFinder: Revealing Relationships in RDF Knowledge Bases", Dec. 2, 2009, Semantic Multimedia, Springer Berlin Heidelberg, Berlin, Heidelberg, pp. 182-187, XP019135190, ISBN: 978-3-642-10542-5.

* cited by examiner

FIG 3A

| subject | predicate | object |
|---|---|---|
| SCHOOL 1 | rdf:type | SCHOOL |
| SCHOOL 2 | rdf:type | SCHOOL |
| PROFESSOR1 | rdf:type | PROFESSOR |
| PROFESSOR2 | rdf:type | PROFESSOR |
| PROFESSOR3 | rdf:type | PROFESSOR |
| ..... | ..... | ..... |
| SCHOOL 1 | SCHOOL - PROFESSOR | PROFESSOR1 |
| SCHOOL 2 | SCHOOL - PROFESSOR | PROFESSOR 2 |
| SCHOOL 3 | SCHOOL - PROFESSOR | PROFESSOR 3 |
| ..... | ..... | ..... |
| SCHOOL PERSONNEL1 | SCHOOL PERSONNEL - STUDENT | STUDENT 1 |
| SCHOOL PERSONNEL2 | SCHOOL PERSONNEL - STUDENT | STUDENT 2 |
| SCHOOL PERSONNEL3 | SCHOOL PERSONNEL - STUDENT | STUDENT 3 |

FIG. 4A

| subject | predicate | object |
|---|---|---|
| SCHOOL | rdf:type | rdfs:class |
| PROFESSOR | rdf:type | rdfs:class |
| LECTURE | rdf:type | rdfs:class |
| DEPARTMENT | rdf:type | rdfs:class |
| TEAM | rdf:type | rdfs:class |
| RESEARCH ACHIEVEMENT | rdf:type | rdfs:class |
| CLASSROOM | rdf:type | rdfs:class |
| STUDENT | rdf:type | rdfs:class |
| SCHOOL PERSONNEL | rdf:type | rdfs:class |
| SCHOOL - PROFESSOR | rdf:type | rdf:property |
| SCHOOL - PROFESSOR | rdfs:domain | SCHOOL |
| SCHOOL - PROFESSOR | rdfs:range | PROFESSOR |
| ..... | ..... | ..... |
| SCHOOL ACHIEVEMENT - STUDENT | rdf:type | rdf:property |
| SCHOOL ACHIEVEMENT - STUDENT | rdfs:domain | SCHOOL PERSONNEL |
| SCHOOL ACHIEVEMENT - STUDENT | rdfs:range | STUDENT |

FIG. 4B

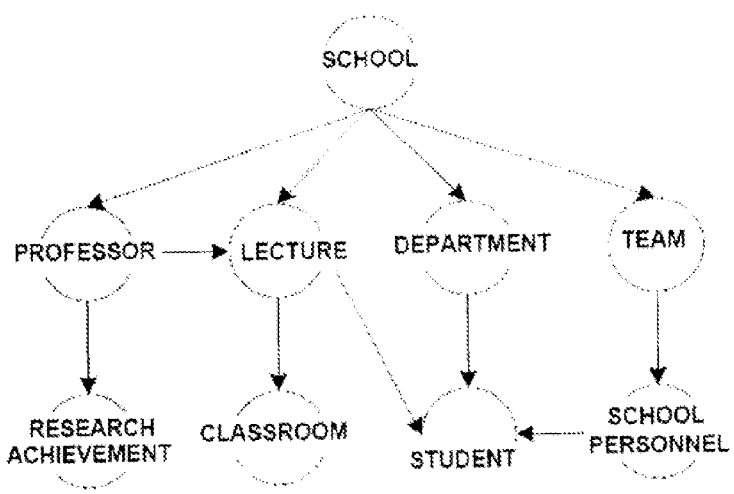

FIG. 5

| StartClass | EndClass | Length | RelationPath |
|---|---|---|---|
| SCHOOL | PROFESSOR | 1 | SCHOOL - PROFESSOR |
| SCHOOL | PROFESSOR | 2 | SCHOOL - LECTURE - PROFESSOR |
| SCHOOL | PROFESSOR | 4 | SCHOOL - DEPARTMENT - STUDENT - LECTURE - PROFESSOR |
| SCHOOL | PROFESSOR | 5 | SCHOOL - TEAM - SCHOOL PERSONNEL - STUDENT - LECTURE - PROFESSOR |
| ..... | ..... | ..... | ..... |
| PROFESSOR | RESEARCH ACHIEVEMENT | 1 | PROFESSOR - RESEARCH ACHIEVEMENT |

THIS IS FORMED VIA SAME RELATED PATH WITH DIFFERENT SEQUENCES AND IS NOT STORED IN THE STORAGE.

| StartClass | EndClass | Length | RelationPath |
|---|---|---|---|
| RESEARCH ACHIEVEMENT | PROFESSOR | 1 | RESEARCH ACHIEVEMENT - PROFESSOR | visitedClassList :

Ontology Schema Path DB

StartClass   EndClass   Length   RelationPath   Type

OBTAIN SUBJECT (I.E., NODE) OF FIRST TUPLE IN WHICH PREDICATE IS RDF:TYPE AND OBJECT IS RDFS:CLASS FROM ONTOLOGY SCHEMA DB visitedClassList : A (A)   Ontology Schema Path DB StartClass   EndClass   Length   RelationPath   Type

FIG. 8C

OBTAIN SUBJECTS (I.E., EDGES) OF ALL TUPLES HAVING "A" AS OBJECT,
IN WHICH PREDICATE IS RDFS:DOMAIN OR RDFS:RANGE
OBTAIN OBJECTS (I.E., NODES) OF TUPLES HAVING SAME SUBJECT AS
OBTAINED SUBJECT, IN WHICH PREDICATE IS RDFS:DOMAIN OR
RDFS:RANGE
HOWEVER, IF OBJECT IS A, IT IS EXCLUDED (OWN RELATIONSHIP IS
EXCLUDED)

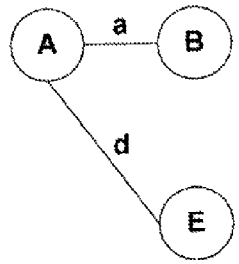

visitedClassList : A, B, E

Ontology Schema Path DB

| EndClass | Length | RelationPath | Type |
|----------|--------|--------------|------|

FIG. 8D

OBTAIN SUBJECT (I.E., EDGE) OF ALL TUPLES HAVING "B" AS OBJECT, IN
WHICH PREDICATE IS RDFS:DOMAIN OR RDFS:RANGE

OBTAIN OBJECT (I.E., NODE) OF TUPLE HAVING SAME SUBJECT AS OBTAINED
SUBJECT, IN WHICH PREDICATE IS RDFS:DOMAIN OR RDFS:RANGE

HOWEVER, IF OBJECT IS A, IT IS EXCLUDED (PARENT-CHILD RELATIONSHIP,
WHICH IS CONSIDERED IN PREVIOUS SEARCH, IS EXCLUDED)

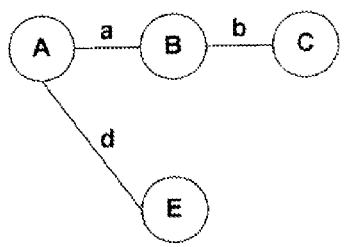

visitedClassList : A, B, E, C

Ontology Schema Path DB

| StartClass | EndClass | Length | RelationPath | Type |
|------------|----------|--------|--------------|------|
| A | B | 1 | A-B | P |
| B | C | 1 | B-C | P |
| A | C | 2 | A-B-C | P |

FIG. 8E

OBTAIN SUBJECTS (I.E., EDGES) OF ALL TUPLES HAVING "C" AS OBJECT, IN WHICH PREDICATE IS RDFS:DOMAIN OR RDFS:RANGE
OBTAIN OBJECTS (I.E., NODES) OF TUPLES HAVING SAME SUBJECT AS OBTAINED SUBJECT, IN WHICH PREDICATE IS RDFS:DOMAIN OR RDFS:RANGE

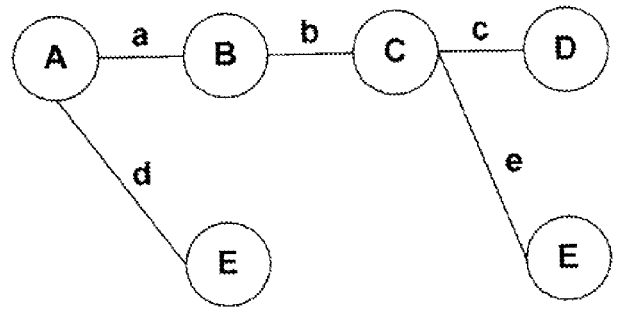

visitedClassList : A, B, E, C, D

Ontology Schema Path DB

| StartClass | EndClass | Length | RelationPath | Type |
|---|---|---|---|---|
| A | B | 1 | A-B | P |
| B | C | 1 | B-C | P |
| A | C | 2 | A-B-C | P |
| C | D | 1 | C-D | P |
| B | D | 2 | B-C-D | P |
| A | D | 3 | A-B-C-D | P |

FIG. 8F

OBTAIN SUBJECTS (I.E., EDGES) OF ALL TUPLES HAVING "D" AS OBJECT, IN WHICH PREDICATE IS RDFS:DOMAIN OR RDFS:RANGE
OBTAIN OBJECT (I.E., NODE) OF TUPLE HAVING SAME SUBJECT AS OBTAINED SUBJECT, IN WHICH PREDICATE IS RDFS:DOMAIN OR RDFS:RANGE

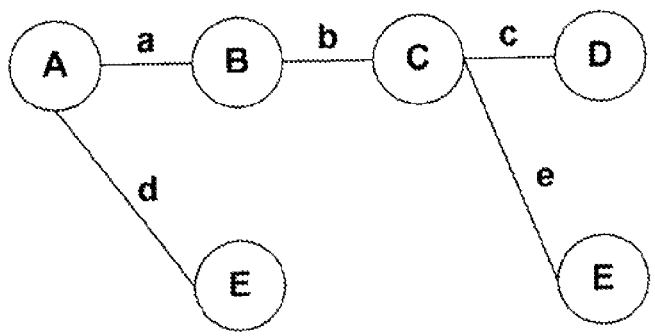

visitedClassList : A, B, E, C, D

Ontology Schema Path DB

| StartClass | EndClass | Length | RelationPath | Type |
|---|---|---|---|---|
| A | B | 1 | A-B | P |
| B | C | 1 | B-C | P |
| A | C | 2 | A-B-C | P |
| C | D | 1 | C-D | P |
| B | D | 2 | B-C-D | P |
| A | D | 3 | A-B-C-D | P |

"D" DOES NOT HAVE ANY RELATED CLASSES AND THUS IS DELETED visitedClassList : A, B, E, C, D Ontology Schema Path DB

| StartClass | EndClass | Length | RelationPath | Type |
|---|---|---|---|---|
| A | B | 1 | A-B | P |
| B | C | 1 | B-C | P |
| A | C | 2 | A-B-C | P |
| C | D | 1 | C-D | P |
| B | D | 2 | B-C-D | P |
| A | D | 3 | A-B-C-D | P |

GENERATE PATH WITH RESPECT TO "E", WHICH HAS
PREVIOUSLY BEEN VISITED visitedClassList : A, B, E, C, D Ontology Schema Path DB

| StartClass | EndClass | Length | RelationPath | Type |
|---|---|---|---|---|
| A | B | 1 | A-B | P |
| B | C | 1 | B-C | P |
| A | C | 2 | A-B-C | P |
| C | D | 1 | C-D | P |
| B | D | 2 | B-C-D | P |
| A | D | 3 | A-B-C-D | P |
| C | E | 1 | C-E | P |
| B | E | 2 | B-C-E | P |
| A | E | 3 | A-B-C-E | P |

FIG. 8I

OBTAIN SUBJECTS (I.E., EDGES) OF ALL TUPLES HAVING "E" AS
OBJECT, IN WHICH PREDICATE IS RDFS:DOMAIN OR RDFS:RANGE
OBTAIN OBJECT (I.E., NODE) OF TUPLE HAVING SAME SUBJECT AS
OBTAINED SUBJECT, IN WHICH PREDICATE IS RDFS:DOMAIN OR
RDFS:RANGE
HOWEVER, IF OBTAINED SUBJECT IS IN CURRENT PATH, I.E., IF IT
FORMS CIRCULATION PATH, CORRESPONDING SUBJECT IS DELETED
AFTER REPRESENTING IT AS GRAPH.

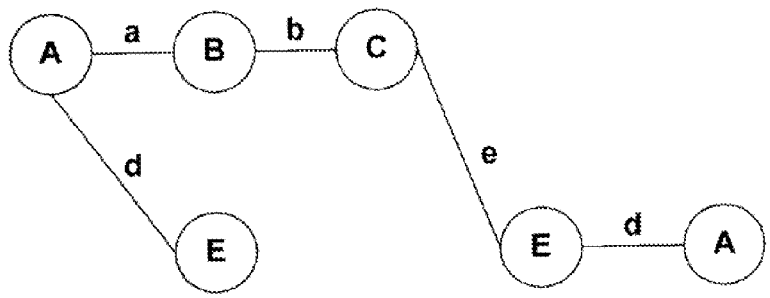

visitedClassList : A, B, E, C, D

Ontology Schema Path DB

| StartClass | EndClass | Length | RelationPath | Type |
|---|---|---|---|---|
| A | B | 1 | A-B | P |
| B | C | 1 | B-C | P |
| A | C | 2 | A-B-C | P |
| C | D | 1 | C-D | P |
| B | D | 2 | B-C-D | P |
| A | D | 3 | A-B-C-D | P |
| C | E | 1 | C-E | P |
| B | E | 2 | B-C-E | P |
| ~~A~~ | ~~E~~ | ~~3~~ | ~~A-B-C-E~~ | ~~P~~ |
| A | E | 3 | A-B-C-E-A | G |

CHANGED TO GRAPH

DELETE ALL CLASSES CONSIDERED FOR
PATH GENERATION visitedClassList : A, B, E, C, D Ontology Schema Path DB

| StartClass | EndClass | Length | RelationPath | Type |
|---|---|---|---|---|
| A | B | 1 | A-B | P |
| B | C | 1 | B-C | P |
| A | C | 2 | A-B-C | P |
| C | D | 1 | C-D | P |
| B | D | 2 | B-C-D | P |
| A | D | 3 | A-B-C-D | P |
| C | E | 1 | C-E | P |
| B | E | 2 | B-C-E | P |
| A | E | 3 | A-B-C-E | G |
| A | E | 1 | A-E | P |

FIG. 8K

OBTAIN SUBJECT (I.E., EDGE) OF ALL TUPLES HAVING "E" AS OBJECT, IN WHICH PREDICATE IS RDFS:DOMAIN OR RDFS:RANGE
OBTAIN OBJECT (I.E., NODE) OF TUPLE HAVING SAME SUBJECT AS OBTAINED SUBJECT, IN WHICH PREDICATE IS RDFS:DOMAIN OR RDFS:RANGE
HOWEVER, IF THERE IS SAME REVERSE PATH, IT IS NOT STORED.

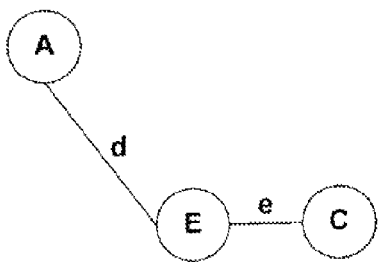

visitedClassList : A, B, E, C, D

Ontology Schema Path DB

| StartClass | EndClass | Length | RelationPath | Type |
|---|---|---|---|---|
| A | B | 1 | A-B | P |
| B | C | 1 | B-C | P |
| A | C | 2 | A-B-C | P |
| C | D | 1 | C-D | P |
| B | D | 2 | B-C-D | P |
| A | D | 3 | A-B-C-D | P |
| C | E | 1 | C-E | P |
| B | E | 2 | B-C-E | P |
| A | E | 3 | A-B-C-E | P |
| A | E | 1 | A-E | P |
| E | G | 1 | E-G | P |
| A | C | 2 | A-E-D | P |

DELETE REVERSE DUPLICATION

FIG. 8L

OBTAIN SUBJECT (I.E., EDGE) OF ALL TUPLES HAVING "C" AS OBJECT, IN WHICH PREDICATE IS RDFS:DOMAIN OR RDFS:RANGE
OBTAIN OBJECTS (I.E., NODES) OF TUPLES HAVING SAME SUBJECT AS OBTAINED SUBJECT, IN WHICH PREDICATE IS RDFS:DOMAIN OR RDFS:RANGE
HOWEVER, IF THERE IS SAME REVERSE PATH, IT IS NOT STORED

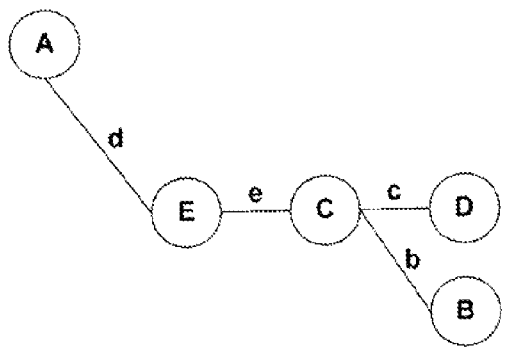

visitedClassList : A, B, E, C, D

Ontology Schema Path DB

| StartClass | EndClass | Length | RelationPath | Type |
|---|---|---|---|---|
| A | B | 1 | A-B | P |
| B | C | 1 | B-C | P |
| A | C | 2 | A-B-C | P |
| C | D | 1 | C-D | P |
| B | D | 2 | B-C-D | P |
| A | D | 3 | A-B-C-D | P |
| C | E | 1 | C-E | P |
| B | E | 2 | B-C-E | P |
| A | E | 3 | A-B-C-E | P |
| A | E | 1 | A-E | P |
| A | C | 2 | A-E-C | P |
| ~~C~~ | ~~D~~ | ~~1~~ | ~~C-D~~ | ~~P~~ |
| E | D | 2 | E-C-D | P |
| A | D | 3 | A-E-C-D | P |

DELETE DUPLICATION

DELETE ALL CLASSES CONSIDERED FOR PATH GENERATION visitedClassList : A, B, E, C, D Ontology Schema Path DB

| | StartClass | EndClass | Length | RelationPath | Type |
|---|---|---|---|---|---|
| | A | B | 1 | A-B | P |
| ▼ | B | C | 1 | B-C | P |
| | A | C | 2 | A-B-C | P |
| | C | D | 1 | C-D | P |
| | B | D | 2 | B-C-D | P |
| | A | D | 3 | A-B-C-D | P |
| | C | E | 1 | C-E | P |
| ▼ | B | E | 2 | B-C-E | P |
| | A | E | 3 | A-B-C-E | P |
| | A | E | 1 | A-E | P |
| | A | C | 2 | A-E-C | P |
| | E | D | 2 | E-C-D | P |
| | A | D | 3 | A-E-C-D | P |
| | ~~C~~ | ~~B~~ | ~~1~~ | ~~C-B~~ | ~~P~~ |
| | ~~E~~ | ~~B~~ | ~~2~~ | ~~E-C-B~~ | ~~P~~ |
| | A | B | 3 | A-E-C-B | P |

DELETE REVERSE DUPLICATION

FIG. 8N

OBTAIN SUBJECT (I.E., EDGE) OF ALL TUPLES HAVING "B" AS OBJECT, IN WHICH PREDICATE IS RDFS:DOMAIN OR RDFS:RANGE
OBTAIN OBJECT (I.E., NODE) OF TUPLE HAVING SAME SUBJECT AS OBTAINED SUBJECT, IN WHICH PREDICATE IS RDFS:DOMAIN OR RDFS:RANGE

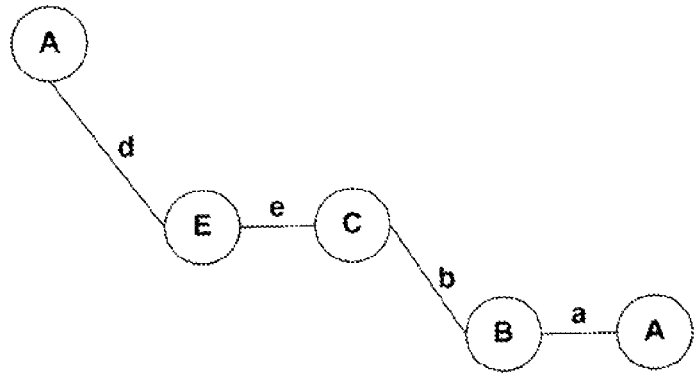

visitedClassList : A, B, E, C, D

Ontology Schema Path DB

| StartClass | EndClass | Length | RelationPath | Type |
|---|---|---|---|---|
| A | B | 1 | A-B | P |
| B | C | 1 | B-C | P |
| A | C | 2 | A-B-C | P |
| C | D | 1 | C-D | P |
| B | D | 2 | B-C-D | P |
| A | D | 3 | A-B-C-D | P |
| C | E | 1 | C-E | P |
| B | E | 2 | B-C-E | P |
| A | E | 3 | A-B-C-E | P |
| A | E | 1 | A-E | P |
| A | C | 2 | A-E-C | P |
| E | D | 2 | E-C-D | P |
| A | D | 3 | A-E-C-D | P |
| ~~A~~ | ~~B~~ | ~~3~~ | ~~A-E-C-B~~ | ~~P~~ |
| A | B | 3 | A-E-C-B-A | G |

CHANGED TO GRAPH

FIG. 80 visitedClassList : A, B, E, C, D

Ontology Schema Path DB

| StartClass | EndClass | Length | RelationPath | Type |
|---|---|---|---|---|
| A | B | 1 | A-B | P |
| B | C | 1 | B-C | P |
| A | C | 2 | A-B-C | P |
| C | D | 1 | C-D | P |
| B | D | 2 | B-C-D | P |
| A | D | 3 | A-B-C-D | P |
| C | E | 1 | C-E | P |
| B | E | 2 | B-C-E | P |
| A | E | 3 | A-B-C-E | P |
| A | E | 1 | A-E | P |
| A | C | 2 | A-E-C | P |
| E | D | 2 | E-C-D | P |
| A | D | 3 | A-E-C-D | P |
| A | B | 3 | A-E-C-B-A | G |
| B | C | 3 | B-A-E-C | C |

SELECT TUPLE (T1) IN WHICH TYPE IS P AND STARTCLASS DOES NOT INCLUDE ROOT

SELECT TUPLE (T2) IN WHICH TYPE IS G

EXTRACT MAXIMUM PATH OF T1.START AND T2.END IN WHICH RELATIONPATH OF T1 IS INCLUDED IN RELATIONPATH OF T2

DETERMINE NEW PATH FROM T1.START TO T2.END IN RELATIONPATH OF T2

THERE IS B-A-E-C (LENGTH:3)

ADD NEWLY SEARCHED PATH

APPARATUS AND METHOD OF SEARCHING FOR INSTANCE PATH BASED ON ONTOLOGY SCHEMA

CROSS-REFERENCE TO RELATED PATENT APPLICATION

This application claims the benefit of Korean Patent Application No. 10-2011-0054015, filed on Jun. 3, 2011, in the Korean Intellectual Property Office, the disclosure of which is incorporated herein in its entirety by reference.

BACKGROUND OF THE INVENTION

1. Field of the Invention

The present invention relates to an apparatus and method of searching for an instance path based on an ontology schema and, more particularly, to an apparatus and method of searching for an instance path based on an ontology schema, in which an instance path search apparatus receives two or more keywords from a user, generates a pair of instances with respect to the keywords, respectively, extracts a pair of classes corresponding to each of the pairs of instances, respectively, obtains an ontology schema path with respect to each of the pairs of classes, respectively, and searches for an instance path using each of the ontology schema paths, respectively.

2. Description of the Related Art

In general, people are able to intuitively determine the semantic relationship between words used. For example, it can be seen that while there is a close relationship between "football boots" an d "football", there is no special relationship between "football boots" and "vehicle". Therefore, when people read a document, they may know this document is associated with which word and may recall a related word from the document even when the associated word is not included in the document.

Since a Semantic Web, a next generation web technology, in which a computer can understand the meaning of data on the web and perform logical reasoning, has attracted much attention, the amount of Web data represented in RDF/RDFS increases.

However, it is very difficult for even experts to directly search for a relationship between instances from a massive triple store. Moreover, in order to search for the relationship between instances in a systematic manner, the search is performed based on the direction of the relationship, and thus it is impossible to search for diverse and complex relationships, which is very problematic.

SUMMARY OF THE INVENTION

The present invention has been made in an effort to solve the above-described problems associated with prior art, and an object of the present invention is to provide an apparatus and method of searching for an instance path based on an ontology schema, which can search for a path between class-based instances in order to rapidly search for diverse and complex relationships.

Another object of the present invention is to provide an apparatus and method of searching for an instance path based on an ontology schema, which can search for an instance path by searching for all relationships without considering the direction of classes or instances.

According to an aspect of the present invention to achieve the above object of the present invention, there is provided a method of searching for an instance path based on an ontology schema, the method being performed by an instance path search apparatus, the method comprising: (a) receiving two or more keywords from a user and generating a pair of instances with respect to the keywords, respectively; (b) extracting a pair of classes corresponding to each of the pairs of instances from an ontology instance database, respectively; (c) obtaining an ontology schema path with respect to each of the pairs of classes from an ontology schema path database, respectively; and (d) replacing start and end classes with corresponding first and second instances in each of the ontology schema paths and searching for an instance path connected between the first instance and the second instance, respectively.

The method may further comprise, before step (a), searching for an ontology schema path between classes with respect to all classes stored in the ontology schema database, respectively, and storing the searched ontology schema paths in the ontology schema path database.

The method may further comprise, if an update of the ontology schema database is detected, searching for an ontology schema path of the updated class and updating the ontology schema path database.

The method may further comprise visualizing the searched ontology schema paths.

Step (a) may comprise: obtaining instances of the input keywords from the ontology instance database; and generating a pair of instances with respect to the obtained instances, respectively.

Step (c) may comprise searching the ontology schema path database and obtaining an ontology schema path, in which the start class and the end class corresponding to each pair of classes are connected to the start or end, for each pair of classes, respectively.

Step (d) may comprise: (d-1) replacing the start and end classes with corresponding first and second instances in the ontology schema path; (d-2) dividing the ontology schema path into halves and generating a first join schedule including the first instance and a second join schedule including the second instance; (d-3) if there is a class connected to the first instance or second instance based on the first or second join schedule, extracting at least one instance connected to the first instance or second instance from instances included in the connected class; and (d-4) generating instance paths in which the extracted instances are connected between the first instance and the second instance.

Step (d-3) may comprise: if the first or second instance is connected to at least one class in the first or second join schedule, extracting at least one instance connected to the first or second instance from instances of a first or second class directly connected to the first or second instance; if there is another class connected to the first or second class in the first or second join schedule, extracting at least one instance connected to each of the extracted instances from instances of the connected class; and connecting the first or second instance to the extracted instances depending on their relationship and generating at least one first or second instance path.

The method may further comprise, if there is not another class connected to the first or second class in the first or second join schedule, connecting the first or second instance to the instances extracted from the first or second class depending on their relationship and generating at least one first or second instance path.

The method may further comprise, if a path search condition including at least one of an instance path length, a number of results derived, and a response time is input together with the keywords, searching for an instance path based on the path search condition.

According to another aspect of the present invention to achieve the above object of the present invention, there is provided an apparatus of searching for an instance path based on an ontology schema, the apparatus comprising: an ontology schema database in which relationship information between classes is stored; an ontology instance database in which relationship information between instances is stored; an ontology schema path database in which ontology schema paths between classes with respect to all classes stored in the ontology schema database are stored; a user interface unit which receives two or more keywords from a user; an instance pair generation unit which obtains instances of the input keywords from the ontology instance database and generating pairs of instances; a class pair extraction unit which extracts a pair of classes corresponding to each of the generated pairs of instances from the ontology instance database, respectively; an ontology schema path acquisition unit which obtains an ontology schema path with respect to each of the pairs of classes from the ontology schema path database, respectively; and an instance path search unit which replaces start and end classes with corresponding first and second instances in the ontology schema path and searches for an instance path connected between the first instance and the second instance, respectively.

The apparatus may further comprise an ontology schema path generation unit which searches for ontology schema paths between classes with respect to all classes stored in the ontology schema database and builds the ontology schema path database.

If an update of the ontology schema database is detected, the ontology schema path generation unit may search for an ontology schema path of the updated class and update the ontology schema path database.

The apparatus may further comprise a visualization unit which visualizes the instance paths searched by the instance path search unit in the form of a graph or a list.

The ontology schema path acquisition unit may search the ontology schema path database and obtain an ontology schema path, in which the start class and the end class corresponding to each pair of classes are connected to the start or end, for each pair of classes, respectively.

The instance path search unit may comprise: a join schedule generation module which replaces the start and end classes with corresponding first and second instances in the ontology schema path, divides the ontology schema path into halves, and generates a first join schedule including the first instance and a second join schedule including the second instance; an instance search module which, if there is a class connected to the first instance or second instance based on the first or second join schedule, extracts at least one instance connected to the first instance or second instance from instances included in the connected class; and an instance path generation module which generates instance paths in which the extracted instances are connected between the first instance and the second instance.

If the first or second instance is connected to at least one class in the first or second join schedule, the instance search module may extract at least one instance connected to the first or second instance from instances of a first or second class directly connected to the first or second instance, and if there is another class connected to the first or second class, the instance search module may extract at least one instance connected to each of the extracted instances from the instances of the connected class, connect the first or second instance to the extracted instances depending on their relationship, and generate at least one first or second instance path.

If there is not another class connected to the first or second class in the first or second join schedule, the instance search module may connect the first or second instance to the instances extracted from the first or second class depending on their relationship and generate at least one first or second instance path.

If a path search condition including at least one of an instance path length, a number of results derived, and a response time is input together with the keywords, the instance path search unit may search for an instance path based on the path search condition.

BRIEF DESCRIPTION OF THE DRAWINGS

The above and other features and advantages of the present invention will become more apparent by describing in detail exemplary embodiments thereof with reference to the attached drawings in which:

FIGS. 3A and 3B are illustrative diagrams showing the structure of an ontology instance database shown in FIG. 2;

FIGS. 4A and 4B are illustrative diagrams showing the structure of an ontology schema database shown in FIG. 2;

FIG. 5 is an illustrative diagram showing the structure of an ontology schema path database shown in FIG. 2;

DETAILED DESCRIPTION OF THE INVENTION

Details of the forgoing objects, technical construction and corresponding operational effect of the present invention are more clearly understood by the following detailed descriptions based on the drawings attached to the specification of the present invention.

The term "keyword" as described herein refers to a user keyword having one or more uniform resource identifiers (URIs), and the term "instance" refers to a URI for the keyword.

The term "class" refers to a group including related instances.

The term "ontology schema path" refers to a path in which classes are connected via one or more relationships, and the term "instance path" refers to a path in which instances are connected via one or more relationships.

Figure 1:
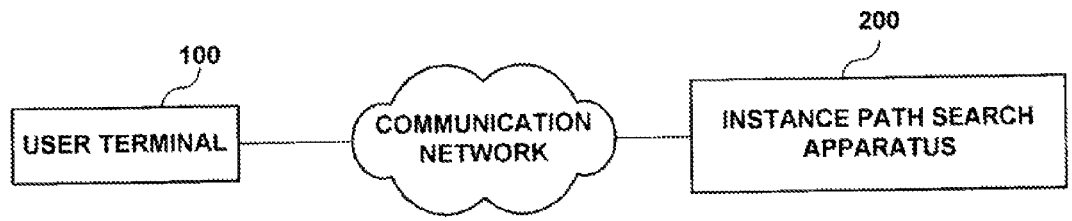
FIG. 1 is a diagram showing an ontology schema-based instance path search system in accordance with the present invention.

FIG. 1 is a diagram showing an ontology schema-based instance path search system in accordance with the present invention.

Referring to FIG. 1, an ontology schema-based instance path search system comprises a user terminal 100 which receives a keyword and an instance path search apparatus 200 which searches for an instance path with respect to the keywords from the user terminal 100.

The user terminal 100 refers to a wired communication terminal such as a PC or a mobile communication terminal such as a cellular phone, a notebook, etc.

The instance path search apparatus 200 receives two or more keywords from the user terminal 100, generates a pair of instances with respect to the keywords, respectively, and extracts a pair of classes corresponding to each of the pairs of instances from an already built ontology instance database, respectively. Then, the instance path search apparatus 200 obtains an ontology schema path with respect to each of the pairs of classes from an ontology schema path database, respectively, and searches for an instance path using each of the ontology schema paths, respectively.

The instance path search apparatus 200 that performs the above-described functions will be described in detail with reference to FIG. 2 below.

Figure 2:
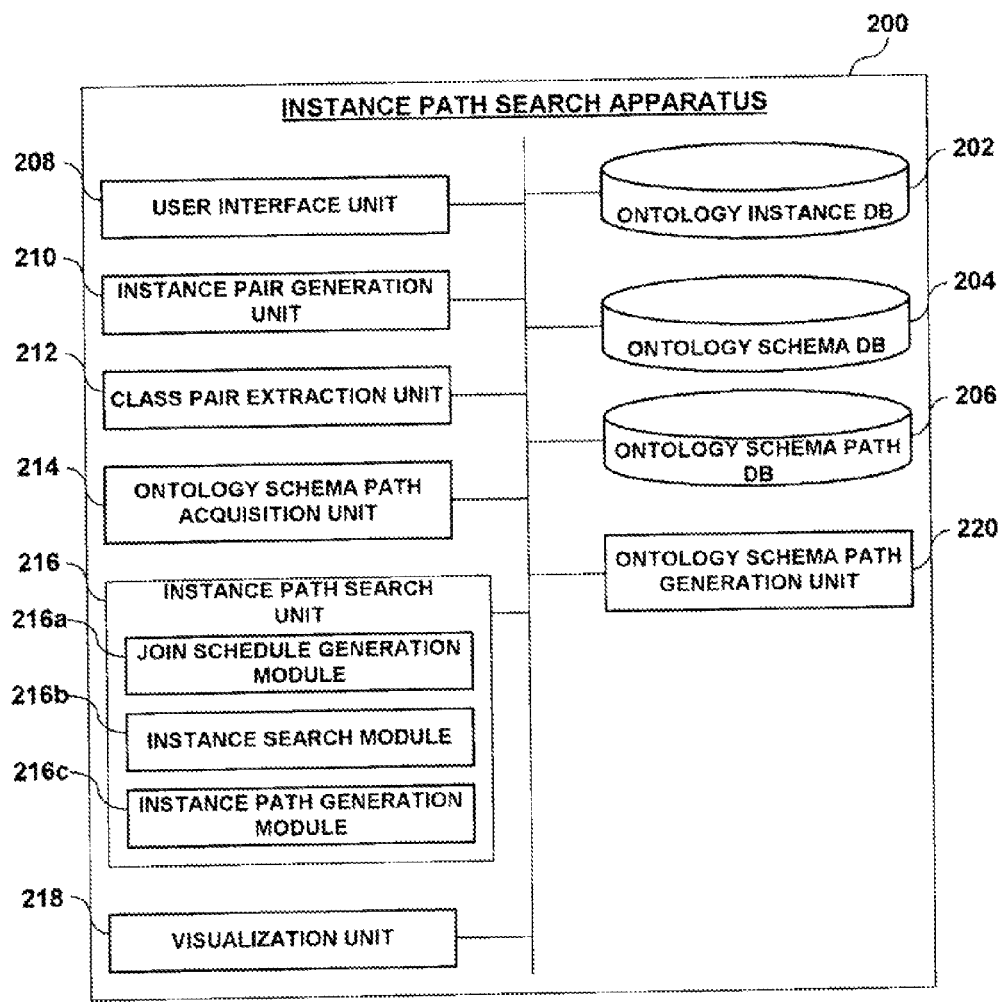
FIG. 2 is a schematic block diagram showing the configuration of an instance path search apparatus in accordance with the present invention.
Figure 3B:
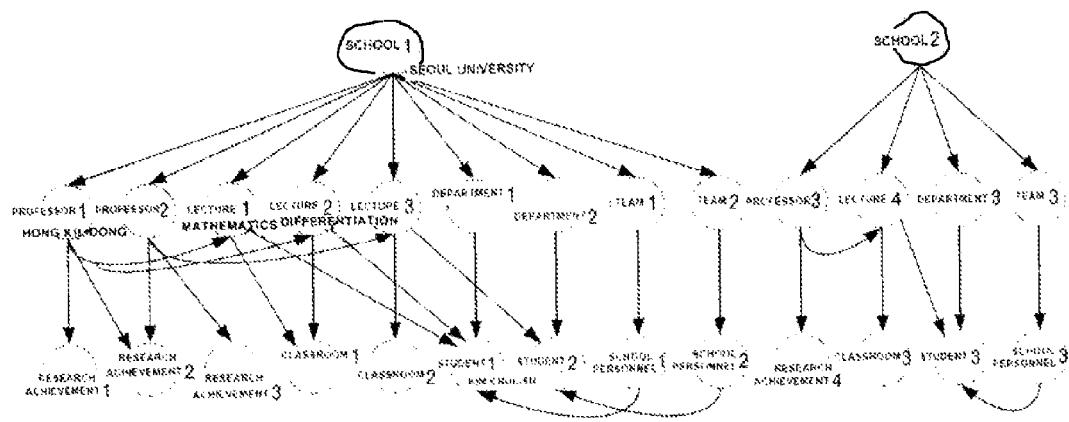

FIG. 2 is a schematic block diagram showing the configuration of an instance path search apparatus in accordance with the present invention, FIGS. 3A and 3B are illustrative diagram showing the structure of an ontology instance database shown in FIG. 2, FIGS. 4A and 4B are illustrative diagrams showing the structure of an ontology schema database shown in FIG. 2, and FIG. 5 is an illustrative diagram showing the structure of an ontology schema path database shown in FIG. 2.

Referring to FIG. 2, the instance path search apparatus 200 comprises an ontology instance database 202 in which relationship information between instances is stored, an ontology schema database 204 relationship information between classes is stored, an ontology schema path database 206, a user interface unit 208, an instance pair generation unit 210, a class pair extraction unit 212, an ontology schema path acquisition unit 214, an instance path search unit 216, a visualization unit 218, and an ontology schema path generation unit 220.

In the ontology instance database 202, the relationship between instances is registered as shown in FIGS. 3A and 3B.

The ontology instance database 202 will be described in more detail with reference to FIGS. 3A and 3B below. In the ontology instance database 202, a subject, an object, and a predicate with respect to an instance are defined as shown in FIG. 3A. For example, if "school 1" is the subject and "professor 1" is the object, the "school 1" and the "professor 1" are defined as the relationship between the predicates of "school-professor".

Thus, the relationship between two instances is established by the predicates.

When visualizing the table of FIG. 3A as a graph, the relationship between the instances is represented as a graph as shown in FIG. 3B.

In the ontology schema database 204, the relationship between classes is registered as shown in FIGS. 4A and 4B.

The ontology schema database 204 will be described in more detail with reference to FIGS. 4A and 4B below. In the ontology schema database 204, a subject, an object, and a predicate with respect to a class are defined as shown in FIG. 4A. That is, the relationship between two classes is established by the predicates.

When visualizing the table of FIG. 4A as a graph, the relationship between the classes is represented as a graph as shown in FIG. 4B.

In the ontology schema path database 206, ontology schema paths between classes with respect to all classes stored in the ontology schema database 204 are stored.

The ontology schema path database 206 will be described in more detail with reference to FIG. 5 below. In the ontology schema path database 206, a path, a path length, etc. with respect to a start class and an end class are registered.

The user interface unit 208 receives two or more keywords from a user. The user interface unit 208 receives the keywords from a user terminal via a communication network or via an input unit provided in the user terminal.

The instance pair generation unit 210 obtains instances of the input keywords from the ontology instance database 202 and generates pairs of instances. That is, the instance pair generation unit 210 obtains instances of the input keywords and generates a pair of instances with respect to the obtained instances, respectively.

For example, if the obtained instances are A, B, and C, the instance pair generation unit 210 generates three pairs of instances such as A-B, A-C, and B-C.

The class pair extraction unit 212 extracts a pair of classes corresponding to each of the generated pairs of instances from the ontology instance database 202, respectively.

For example, if "school 2-professor 3" are the instances, the class pair extraction unit 212 searches the ontology instance database 202 and extracts "school" corresponding to the "school 2" and "professor" corresponding to the "professor 2", thus extracting a pair of classes of "school-professor".

In more detail, the class pair extraction unit 212 searches the ontology instance database 202, extracts values of an object in which the values of a subject are instances and the value of a predicate are rdf:type, and extracts the extracted values of the object as a class.

The ontology schema path acquisition unit 214 obtains an ontology schema path with respect to each of the pairs of classes from the ontology schema path database 206, respectively.

That is, since the ontology schema path with respect to each of the pairs of classes is stored in the ontology schema path database 206, the ontology schema path acquisition unit 214 can obtain the ontology schema path with respect to the corresponding pair of classes by searching the ontology schema path database 206.

In other words, the ontology schema path acquisition unit 214 searches the ontology schema path database 206 and obtains an ontology schema path, in which the start class and the end class corresponding to each pair of classes are connected to the start or end, for each pair of classes, respectively.

The instance path search unit 216 searches for an instance path using each of the obtained ontology schema paths, respectively.

The instance path search unit 216 that performs the above-described functions comprises a join schedule generation module 216a, an instance search module 216b, and an instance path generation module 216c.

The join schedule generation module 216a replaces the start and end classes with corresponding first and second instances in the ontology schema path, divides the ontology schema path into halves, and generates a first join schedule including the first instance and a second join schedule including the second instance.

If there is a class connected to the first instance or second instance based on the first or second join schedule, the instance search module 216b extracts at least one instance connected to the first instance or second instance from instances included in the connected class.

Moreover, if the first or second instance is connected to at least one class in the first or second join schedule, the instance search module 216b extracts at least one instance connected to the first instance or second instance from instances of a first or second class directed connected to the first or second instance. Then, if there is another class connected to the first or second class, the instance search module 216b extracts at least one instance connected to each of the extracted instances from the instances of the connected class, connects the first or second instance to the extracted instances depending on their relationship, and generates at least one first or second instance path.

Furthermore, if there is not another class connected to a first or second class in the first or second join schedule, the instance search module 216b generates an instance path connected only to the first instance and the second instance.

In addition, if a path search condition including at least one of an instance path length, a number of outputs, and a response time is input together with the keywords through the user interface unit 208, the instance path search unit 216 searches for an instance path based on the path search condition.

The ontology schema path generation unit 220 searches for ontology schema paths between classes with respect to all classes stored in the ontology schema database 204 and builds the ontology schema path database 206.

Moreover, if an update of the ontology schema database 204 is detected, the ontology schema path generation unit 220 searches for an ontology schema path of the updated class and updates the ontology schema path database 206.

The visualization unit 218 visualizes the instance paths searched by the instance path search unit 216 in the form of a graph or a list.

Figure 6:
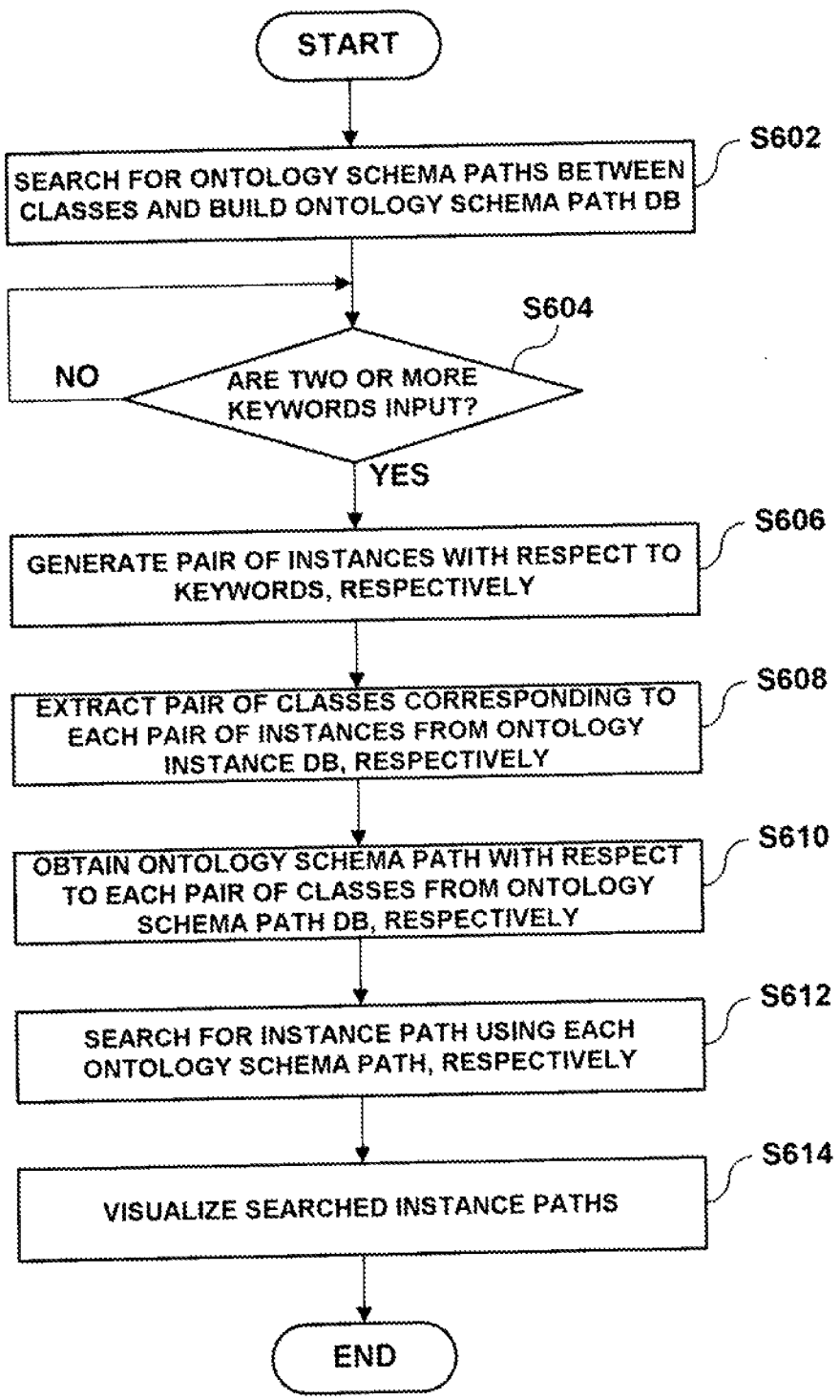
FIG. 6 is a flowchart showing how the instance path search apparatus in accordance with the present invention searches for an instance path.

FIG. 6 is a flowchart showing how the instance path search apparatus in accordance with the present invention searches for an instance path.

Referring to FIG. 6, the instance path search apparatus searches for the ontology schema paths between classes with respect to all classes stored in the ontology schema database and builds the ontology schema path database (S602).

The process of building the ontology schema path database, which is performed by the instance path search apparatus, will be described in more detail with reference to FIG. 7 later.

After performing the step S602, if two or more keywords are input from a user (S604), the instance path search apparatus generates a pair of instances with respect to the keywords, respectively (S606). That is, the instance path search apparatus obtains instances of the input keywords from the ontology instance database and generates a pair of instances with respect to the obtained instances, respectively.

After performing the step S606, the instance path search apparatus extracts a pair of classes corresponding to each of the pairs of instances from the ontology instance database, respectively (S608).

After performing the step S608, the instance path search apparatus obtains an ontology schema path with respect to each of the pairs of classes from the ontology schema path database, respectively (S610). That is, the instance path search apparatus searches the ontology schema path database and obtains an ontology schema path, in which the start class and the end class corresponding to each pair of classes are connected to the start or end, for each pair of classes, respectively.

Then, the instance path search apparatus searches for an instance path using each of the ontology schema paths, respectively (S612).

The process of searching for the instance paths using the ontology schema paths, which is performed by the instance path search apparatus, will be described in more detail with reference to FIG. 9 later.

After performing the step S612, the instance path search apparatus visualizes the searched instance paths (S614).

Figure 7:
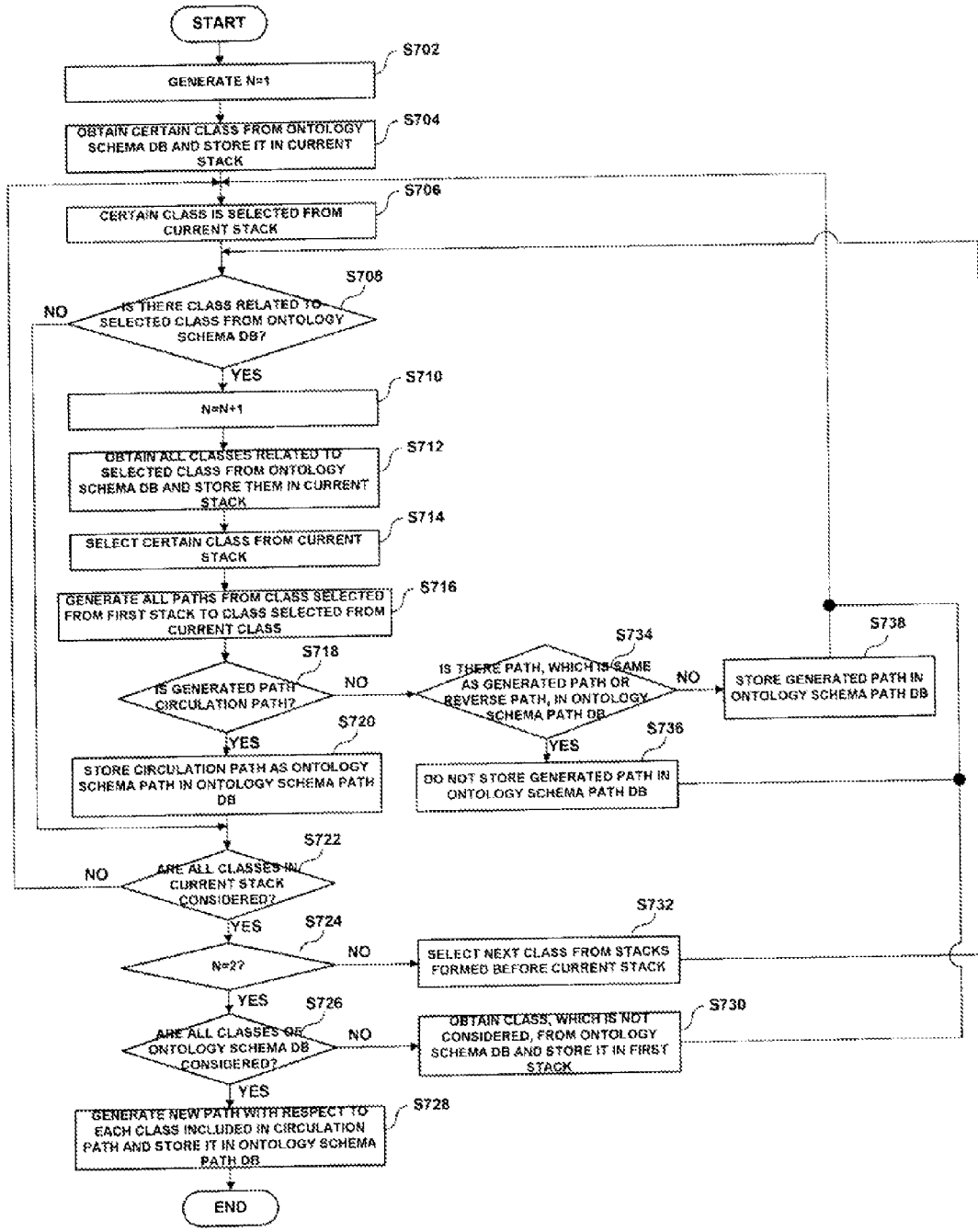
FIG. 7 is a flowchart showing how the instance path search apparatus in accordance with the present invention builds an ontology schema path database.

FIG. 7 is a flowchart showing how the instance path search apparatus in accordance with the present invention builds an ontology schema path database.

Referring to FIG. 7, to select any reference class for path generation, the instance path search apparatus generates a first stack (N=1) (S702), obtains a certain class from the ontology schema database, and stores the obtained class in the current stack (S704). That is, the instance path search apparatus obtains a subject of a tuple, in which the predicate is rdf:type and the object is rdfs:class, from the ontology schema database and stores (i.e., pushes) the obtained subject in the first stack. Here, the obtained subject is the class, and the N is the number of the stack.

After performing the step S704, if a certain class is selected (i.e., popped) from the current stack (S706), the instance path search apparatus searches the ontology schema database and determines whether there is a class related to the selected class (S708).

If it is determined in the step S708 that there is the class related to the selected class, the instance path search apparatus increases the number of stack by one (S710), obtains all classes related to the selected class from the ontology schema database, and stores (i.e., pushes) the obtained classes in the stack whose number is increased by one (S712). That is, in order to select a certain class stored in the current stack and to obtain all classes related to the selected class, the instance path search apparatus obtains a subject of all tuples having the selected class as the object, in which the predicate is rdfs:domain or rdfs:range, from the ontology schema database, obtains an object of all tuples having the selected subject as the subject, in which the predicate is rdfs:domain or rdfs:range, and stores them in the next stack. For example, if the class of "school" of FIG. 4B is selected from the first stack, the class of "professor", "lecture", "department", and "team" is stored in the next second stack.

After performing the step S712, the instance path search apparatus selects (i.e., pops) a certain class from the classes stored in the current stack (S714) and generates all paths from the class selected from the first stack to the class selected from the current class (S716). For example, as shown in FIG. 4B, if the class of "professor" is selected after "school" is stored in the first stack and the second stack including "professor", "lecture", "department", and "team" is generated with respect to the class of "school", the instance path search apparatus generates a path of "school-professor".

If the class of "lecture" is selected after a third stack including "research achievement", "lecture", and "school" is generated with respect to the class of "professor" selected from the second stack, the instance path search apparatus generates a path of "school-professor-lecture" and a path of "professor-lecture".

After performing the step S716, the instance path search apparatus determines whether the path generated in the step S716 is a circulation path (S718). That is, in order to avoid the cost of re-searching for the previously generated path during the ontology schema path generation, the instance path search apparatus determines whether the generated path is a circulation path. Here, if the first node and the last node are the same such as "A-C-D-E-A", the instance path search apparatus determines that the corresponding path is a circulation path.

If it is determined in the step S718 that the generated path is a circulation path, the instance path search apparatus stores the circulation path in the ontology schema path database (S720) and determines whether all classes stored in the current stack are considered for the ontology schema path generation (S722). Here, the instance path search apparatus stores the circulation path as the ontology schema path in the ontology schema path database and displays that the corresponding path is a circulation path.

If it is determined in the step S722 that all classes are considered, the instance path search apparatus determines whether the current stack is the second stack (S724).

If it is determined in the step S724 that the current stack is the second stack, the instance path search apparatus determines whether all classes of the ontology schema database are considered for the ontology schema path generation (S726).

If it is determined in the step S726 that all classes are considered for the ontology schema path generation, the instance path search apparatus generates a new path with respect to each class included in the circulation path and stores the generated path in the ontology schema path database (S728). For example, if the path is a circulation path such as "A-E-C-B-A", the instance path search apparatus generates a path in which each of classes E, C, and B included in the circulation path is the start class or end class. For example, the generated path may be a path such as "B-A-E-C" in which B is the start class.

If it is determined in the step S726 that all classes are not considered for the ontology schema path generation, the instance path search apparatus obtains a class, which is not considered, from the ontology schema database, stores the obtained class in the first stack (S730), and then performs the step S706.

That is, the classes are stored in various forms such as a graph, table, etc. in the ontology schema database. Therefore, the instance path search apparatus should generates a path with respect to all classes stored in other forms, and thus the above process is repeated until path information with respect to all classes stored in the ontology schema database is stored in the ontology schema path database.

If it is determined in the step S724 that the current stack is a stack formed after the second stack, the instance path search apparatus selects the next class from the stacks formed before the current stack (S732) and performs the process after the step S708.

If it is determined in the step S722 that all classes stored in the current stack are not considered, the instance path search apparatus performs the step S706.

If it is determined in the step S718 that the generated path is not a circulation path, the instance path search apparatus determines whether there is a path, which is the same as the generated path or the reverse path, in the ontology schema path database (S734). That is, in order to prevent the information of the same path from being repeatedly stored in the ontology schema path database, the instance path search apparatus determines whether there is a path, which is the same as the generated path or the reverse path, in the ontology schema path database.

If it is determined in the step S734 that there is the same path, the instance path search apparatus does not store the generated path in the ontology schema path database (S736) and performs the step S706.

For example, referring to FIG. 5, if the generated path is "research achievement-professor", there is no path of "professor-research achievement" in the ontology schema path database, and thus the instance path search apparatus does not store the path of "research achievement-professor".

If it is determined in the step S734 that there is not the same path, the instance path search apparatus stores the generated path in the ontology schema path database (S738).

The process of building the ontology schema path database, which is performed by the instance path search apparatus, will be described in more detail with reference to FIG. 8 below.

FIG. 8 is a diagram showing how the instance path search apparatus in accordance with the present invention builds an ontology schema path database.

Figures 8A, 8B:
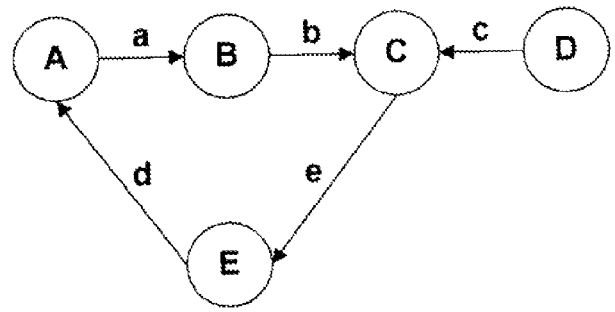
FIG. 8 is a diagram showing how the instance path search apparatus in accordance with the present invention builds an ontology schema path database.

Referring to FIGS. 8A to 8O, if the classes stored in the ontology schema database and their relationship are those shown in FIG. 8A, the instance path search apparatus obtains "A" which is the subject (i.e., node) of the first tuple, in which the predicate is rdf:type and the object is rdfs:class, as shown in FIG. 8B, from the ontology schema database.

Then, the instance path search apparatus obtains "a" and "d", which are the subjects (i.e., edges) of all tuples having "A" as the object, in which the predicate is rdfs:domain or rdfs:range, as show in FIG. 8C. Moreover, the instance path search apparatus obtains "B" and "E", which are the objects (i.e., nodes) of the tuples having the same subject as the obtained subject, in which the predicate is rdfs:domain or rdfs:range. Here, if the object of the tuple having the same subject as "A", in which the predicate is rdfs:domain or rdfs:range is "A", it is the relationship for the same class, and thus "A" is excluded from the search between two classes.

Then, the instance path search apparatus obtains "b", which is the subject (i.e., edge) of all tuples having "B" as the object, in which the predicate is rdfs:domain or rdfs:range, and obtains "C", which is the object (i.e., node) of the tuple having the same subject as the obtained subject, in which the predicate is rdfs:domain or rdfs:range, as show in FIG. 8D. Here, if the object of the tuple having the same subject as the "B", in which the predicate is rdfs:domain or rdfs:range is "A", this relationship has been considered in the previous search, and thus "A" is excluded from the search between two classes.

Then, the instance path search apparatus obtains "c" and "e", which are the subjects (i.e., edges) of all tuples having "C" as the object, in which the predicate is rdfs:domain or rdfs:range, and obtains "D" and "E", which are the objects (i.e., nodes) of the tuples having the same subject as the obtained subject, in which the predicate is rdfs:domain or rdfs:range, as show in FIG. 8E.

Then, the instance path search apparatus obtains the subjects (i.e., edges) of all tuples having "D" as the object, in which the predicate is rdfs:domain or rdfs:range, and obtains the object (i.e., node) of the tuple having the same subject as the obtained subject, in which the predicate is rdfs:domain or rdfs:range, as show in FIG. 8F.

Figure 8G:
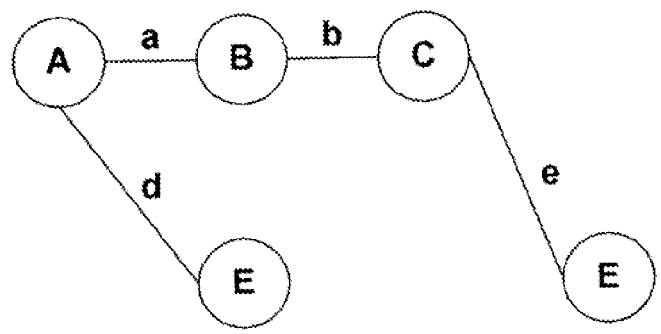
Figure 8H:
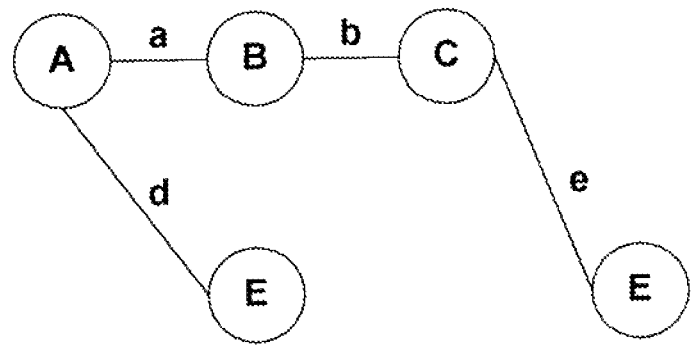

As a result of FIG. 8F, since "D" does not have any related classes, the instance path search apparatus deletes "D" as shown in FIG. 8G and generates a path with respect to "E", which has previously been visited, as shown in FIG. 8H.

Then, the instance path search apparatus obtains "d", which is the subject (i.e., edge) of all tuples having "E" as the object, in which the predicate is rdfs:domain or rdfs:range, and obtains "A", which is the object (i.e., node) of the tuple having the same subject as the obtained subject, in which the predicate is rdfs:domain or rdfs:range, as show in FIG. 8I. Here, the obtained "A" forms a circulation path, and thus "A" is excluded from the following search after the path type is represented as a graph.

Figure 8J:
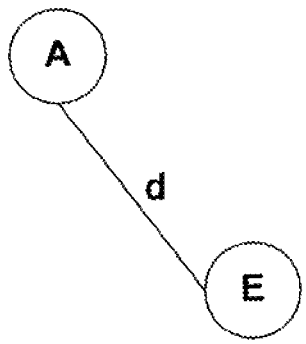

Since the path generated in FIG. 8I is a circulation path, the instance path search apparatus stores the circulation path as the ontology schema path and deletes the classes considered for the path generation as shown in FIG. 8J.

Then, the instance path search apparatus obtains "e", which is the subject (i.e., edge) of all tuples having "E" as the object, in which the predicate is rdfs:domain or rdfs:range, and obtains "C", which is the object (i.e., node) of the tuple having the same subject as the obtained subject, in which the predicate is rdfs:domain or rdfs:range, as show in FIG. 8K. Here, the obtained "C" has the same reverse path and thus is not stored.

Then, the instance path search apparatus obtains "b" and "c", which are the subjects (i.e., edges) of all tuples having "C" as the object, in which the predicate is rdfs:domain or rdfs:range, and obtains "B" and "D", which are the objects (i.e., nodes) of the tuples having the same subject as the obtained subject, in which the predicate is rdfs:domain or rdfs:range, as show in FIG. 8L. Here, the obtained "C-B" and "C-D" have the same reverse path and thus are not stored.

Figure 8M:
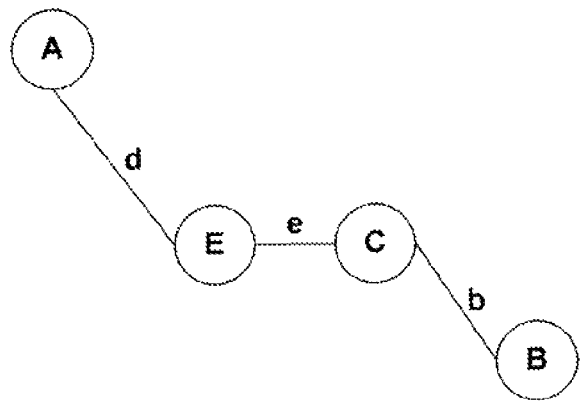

Then, the instance path search apparatus deletes the classes considered for the path generation as shown in FIG. 8M. Moreover, the instance path search apparatus obtains "A", which is the object (i.e., node) of all tuples having "B" as the object, in which the predicate is rdfs:domain or rdfs:range, and obtains the object (i.e., node) of the tuple having the same subject as the obtained subject, in which the predicate is rdfs:domain or rdfs:range, as show in FIG. 8N.

When the path between two classes with respect to all classes stored in the ontology schema database is searched by the above-described process, the instance path search apparatus generates a new path with respect to each class included in the circulation path as shown in FIG. 8O.

For example, in the case of a circulation path such as "A-E-C-B-A", the instance path search apparatus searches for a path in which each of classes E, C, and B included in the circulation path is the start class or end class and further generates a path such as "B-A-E-C" in which B is the start class.

The instance path search apparatus searches for the path between two classes with respect to all classes stored in the ontology schema database, respectively, based on the above-described process. Here, the instance path search apparatus searches for all relationships without considering the direction of classes.

Figure 9:
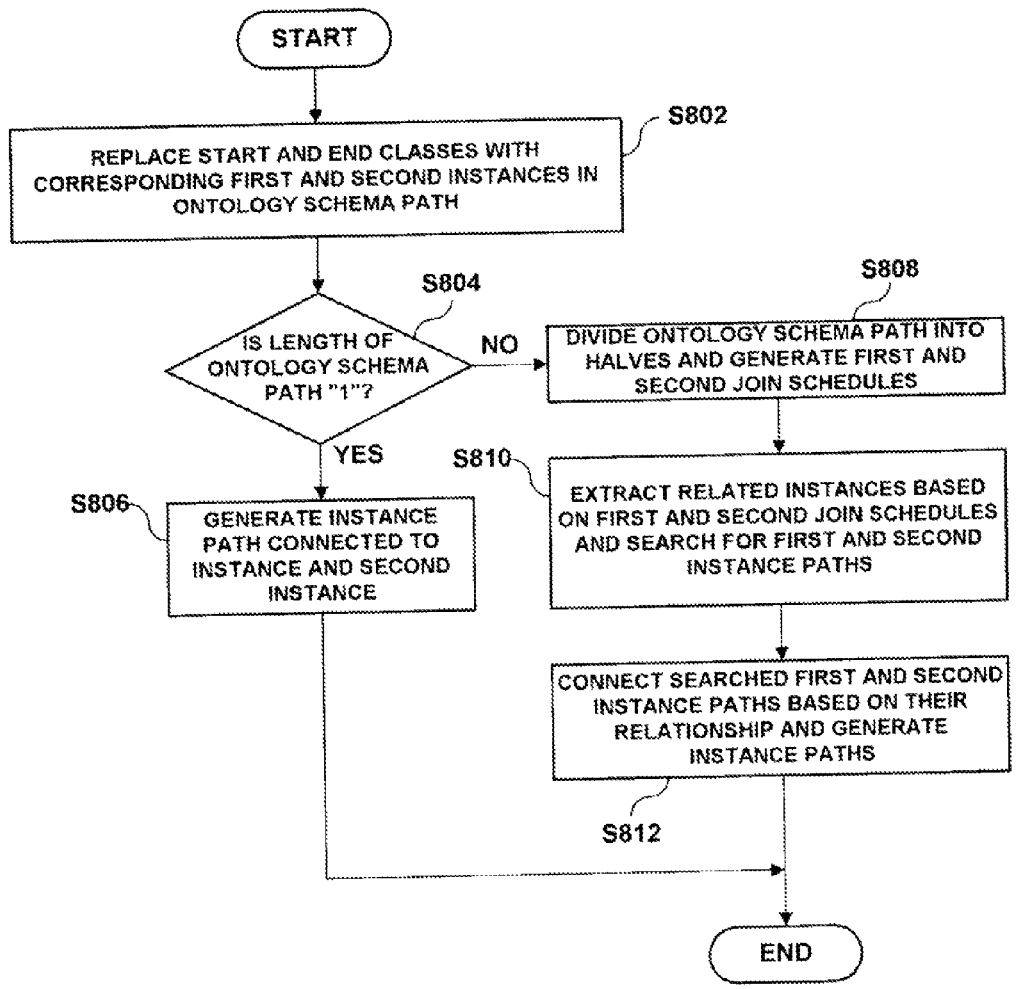
FIG. 9 is a flowchart showing how the instance path search apparatus in accordance with the present invention searches for an instance path.

FIG. 9 is a flowchart showing how the instance path search apparatus in accordance with the present invention searches for an instance path.

Referring to FIG. 9, the instance path search apparatus replaces the start and end classes with corresponding first and second instances in the ontology schema path (S802).

After performing the step S802, the instance path search apparatus determines whether the length of the ontology schema path is "1" (S804).

If it is determined in the step S804 that the length of the ontology schema path is "1", the instance path search apparatus generates an instance path connected to the first instance and the second instance (S806).

If it is determined in the step S804 that the length of the ontology schema path is not "1", the instance path search apparatus divides the ontology schema path into halves and generates a first join schedule including the first instance and a second join schedule including the second instance (S808).

Then, the instance path search apparatus extracts related instances based on the first and second join schedules and searches for first and second instance paths (S810). The process of searching for the first and second instance paths, which is performed by the instance path search apparatus, will be described in more detail with respect to FIG. 10 shortly.

After performing the step S810, the instance path search apparatus connects the searched first and second instance paths based on their relationship and generates the instance paths (S812).

Figure 10:
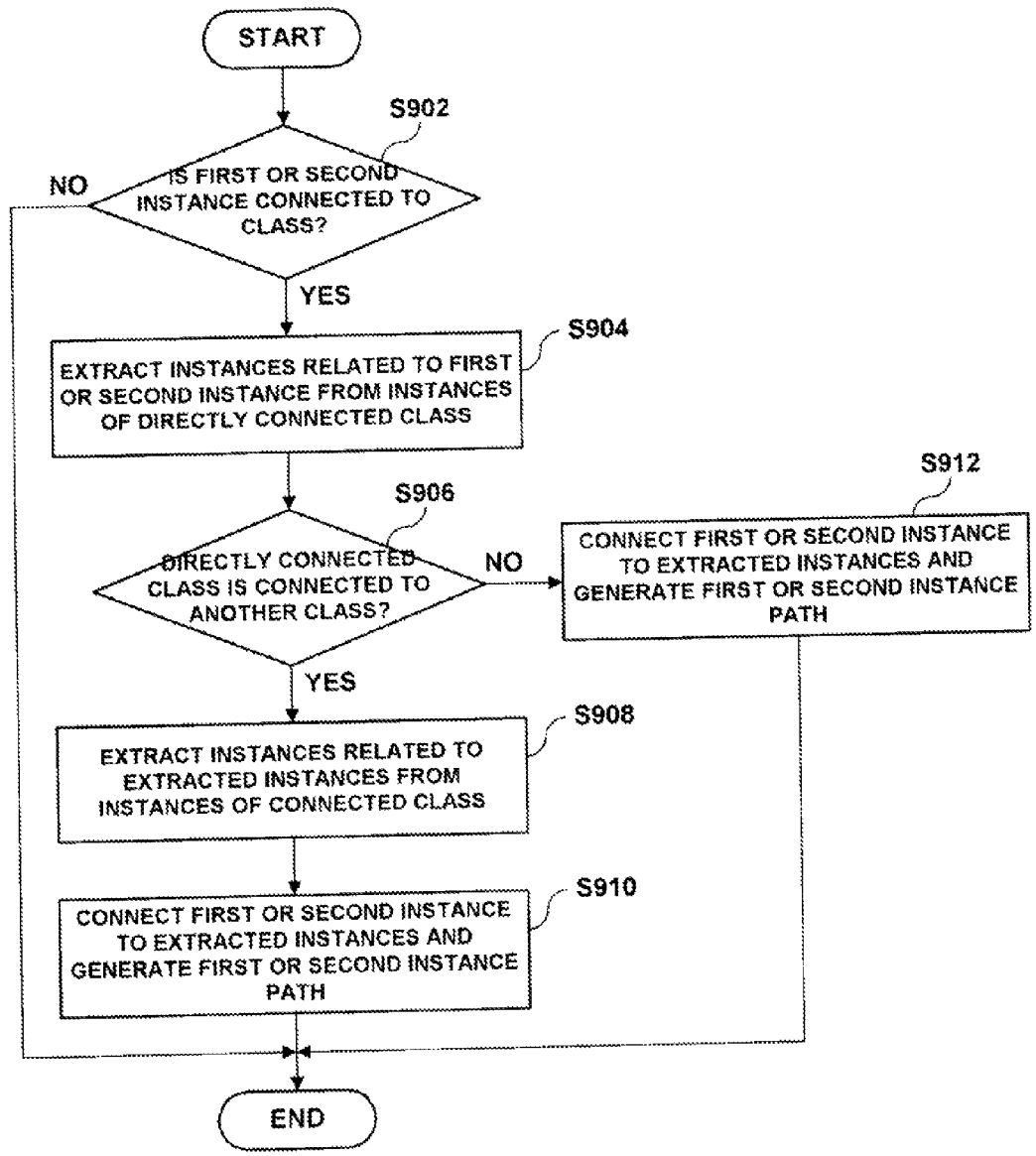
FIG. 10 is a flowchart showing how the instance path search apparatus in accordance with the present invention searches for an instance path based on a join schedule.

FIG. 10 is a flowchart showing how the instance path search apparatus in accordance with the present invention searches for an instance path based on a join schedule.

Referring to FIG. 10, the instance path search apparatus determines whether the first or second instance is connected to at least one class based on the first or second join schedule (S902).

If it is determined in the step S902 that the first or second instance is connected to at least one class, the instance path search apparatus extracts at least one instance related to the first or second instance from instances of a first or second class directly connected to the first or second instance (S904).

Then, the instance path search apparatus determines whether the first or second class is connected to another class based on the first or second join schedule (S906).

If it is determined in the step S906 that the first or second class is connected to another class, the instance path search apparatus extracts at least one instance related to the extracted instances from the instances of the connected class (S908).

Then, the instance path search apparatus connects the first or second instance to the extracted instances depending on their relationship and generates at least one first or second instance path (S910).

If it is determined in the step S906 that the first or second class is not connected to another class, the instance path search apparatus connects the first or second instance to the instances extracted from the first or second class depending on their relationship and generates at least one first or second instance path (S912).

For example, a case where the pair of classes is "B-D" and the ontology schema path is "B-A-E-C-D" will be described.

The instance path search apparatus divides the ontology schema path into "B-A-E" and "C-D" and replaces the start class B and the end class D with instance B0 corresponding to the start class B and instance D0 corresponding to the end class D, thus creating a first join schedule of "B0-A-E" and a second join schedule of "D0-C".

The instance path search apparatus performs a join based on the first join schedule and obtains instances of A0, A1, and A2 connected to B0 from the instances of the class A.

Then, the instance path search apparatus extracts instances connected to each of A0, A1, and A2, i.e., E0 and E1 connected to A0, E1 connected to A1, and E1 and E3 connected to A2, from the instances of the class "E".

Then, the instance path search apparatus extracts first instance paths such as "B0-A0-E0", "B0-A0-E1", "B0-A1-E1", "B0-A2-E1", and "B0-A2-E3" based on the first join schedule.

At the same time, the instance path search apparatus obtains instances C0 and C1 connected to D0 from the instances of the class "C" based on the second join schedule.

Then, the instance path search apparatus extracts second instance paths such as "D0-C0" and "D0-C1" based on the second join schedule.

Then, the instance path search apparatus connects the first instance paths to the second instance paths depending on their relationship. That is, if it is determined from the relationship between E0, E1, and E3 and C0 and C1 that E0 is connected to C0 and C1, the instance path search apparatus generates an instance path of "B0-A0-E0-C0-D0" and an instance path of "B0-A0-E0-C1-D0".

As described above, according to the present invention, it is possible to search for a path between class-based instances in order to rapidly search for diverse and complex relationships.

Moreover, it is possible to search for an instance path by searching for all relationships without considering the direction of classes or instances.

As such, it will be understood by those skilled in the art to which the present invention pertains that the present invention can be implemented in other detailed forms without departing from the scope and spirit of the invention. Therefore, it should be understood that the above exemplary embodiments are only exemplified in all aspects and are not restrictive. The scope of the present invention should be defined by the attached claims, rather than the detailed description, and all additions, substitutions or modifications derived from the meaning and scope of the accompanying claims and equivalent concept thereof should be interpreted as being included in the scope of the present invention.

What is claimed is:

1. A method of searching for an instance path based on an ontology schema, the method being performed by an instance path search apparatus, the method comprising:
   (a) receiving two or more keywords from a user and generating a pair of instances with respect to the keywords, respectively;
   (b) extracting from an ontology instance database a pair of classes where each of the pairs of instances belongs, respectively;
   (c) finding an ontology schema path connected between two or more classes with respect to each of the pairs of classes from an ontology schema path database, respectively, wherein the ontology schema path refers to a route where two or more classes are connected to each other with one or more relationships; and
   (d) replacing start and end classes with corresponding first and second instances in each of the ontology schema paths connected between two or more classes and searching for an instance path connected between the first instance and the second instance, respectively, wherein the instance path refers to a path in which instances are connected via one or more relationships,
   wherein step (d) comprises:
   (d-1) replacing the start and end classes with corresponding first and second instances in the ontology schema path;
   (d-2) dividing the ontology schema path into halves and generating a first join schedule including the first instance and a second join schedule including the second instance;
   (d-3) if there is a class connected to the first instance or second instance based on the first or second join schedule, extracting at least one instance connected to the first instance or second instance from instances included in the connected class; and
   (d-4) generating instance paths in which the extracted instances are connected between the first instance and the second instance.

2. The method of claim 1, further comprising, before step (a), searching for an ontology schema path between classes with respect to all classes stored in the ontology schema database, respectively, and storing the searched ontology schema paths in the ontology schema path database.

3. The method of claim 2, further comprising, if an update of the ontology schema database is detected, searching for an ontology schema path of the updated class and updating the ontology schema path database.

4. The method of claim 1, further comprising visualizing the searched ontology schema paths.

5. The method of claim 1, wherein step (a) comprises:
   obtaining instances of the input keywords from the ontology instance database; and
   generating a pair of instances with respect to the obtained instances, respectively.

6. The method of claim 1, wherein step (c) comprises searching the ontology schema path database and obtaining an ontology schema path, in which the start class and the end class corresponding to each pair of classes are connected to the start or end, for each pair of classes, respectively.

7. The method of claim 1, wherein step (d-3) comprises:
   if the first or second instance is connected to at least one class in the first or second join schedule, extracting at least one instance connected to the first or second instance from instances of a first or second class directly connected to the first or second instance;
   if there is another class connected to the first or second class in the first or second join schedule, extracting at least one instance connected to each of the extracted instances from instances of the connected class; and
   connecting the first or second instance to the extracted instances depending on their relationship and generating at least one first or second instance path.

8. The method of claim 7, further comprising, if there is not another class connected to the first or second class in the first or second join schedule, connecting the first or second instance to the instances extracted from the first or second class depending on their relationship and generating at least one first or second instance path.

9. The method of claim 1, further comprising, if a path search condition including at least one of an instance path length, a number of results derived, and a response time is input together with the keywords, searching for an instance path based on the path search condition.

10. An apparatus of searching for an instance path based on an ontology schema, the apparatus comprising:
    a processor;
    a memory coupled to the processor;
    an ontology schema database in which relationship information between classes is stored;
    an ontology instance database in which relationship information between instances is stored;
    an ontology schema path database in which ontology schema paths connected between two or more classes with respect to all classes stored in the ontology schema database are stored;
    a user interface unit which receives two or more keywords from a user;
    an instance pair generation unit which obtains instances of the input keywords from the ontology instance database and generating pairs of instances;
    a class pair extraction unit which extracts a pair of classes corresponding to each of the generated pairs of instances from the ontology instance database, respectively;
    an ontology schema path acquisition unit which obtains an ontology schema path connected between two or more classes with respect to each of the pairs of classes from the ontology schema path database, respectively; and
    an instance path search unit which replaces start and end classes with corresponding first and second instances in the ontology schema path and searches for an instance path connected between the first instance and the second instance, respectively, wherein the instance path refers to a path in which instances are connected via one or more relationships, wherein the instance path search unit comprises:

a join schedule generation module which replaces the start and end classes with corresponding first and second instances in the ontology schema path, divides the ontology schema path into halves, and generates a first join schedule including the first instance and a second join schedule including the second instance;

an instance search module which, if there is a class connected to the first instance or second instance based on the first or second join schedule, extracts at least one instance connected to the first instance or second instance from instances included in the connected class; and an instance path generation module which generates instance paths in which the extracted instances are connected between the first instance and the second instance.

11. The apparatus of claim 10, further comprising an ontology schema path generation unit which searches for ontology schema paths between classes with respect to all classes stored in the ontology schema database and builds the ontology schema path database.

12. The apparatus of claim 11, wherein if an update of the ontology schema database is detected, the ontology schema path generation unit searches for an ontology schema path of the updated class and updates the ontology schema path database.

13. The apparatus of claim 10, further comprising a visualization unit which visualizes the instance paths searched by the instance path search unit in the form of a graph or a list.

14. The apparatus of claim 10, wherein the ontology schema path acquisition unit searches the ontology schema path database and obtains an ontology schema path, in which the start class and the end class corresponding to each pair of classes are connected to the start or end, for each pair of classes, respectively.

15. The apparatus of claim 10, wherein if the first or second instance is connected to at least one class in the first or second join schedule, the instance search module extracts at least one instance connected to the first or second instance from instances of a first or second class directly connected to the first or second instance, and if there is another class connected to the first or second class, the instance search module extracts at least one instance connected to each of the extracted instances from the instances of the connected class, connects the first or second instance to the extracted instances depending on their relationship, and generates at least one first or second instance path.

16. The apparatus of claim 15, wherein if there is not another class connected to the first or second class in the first or second join schedule, the instance search module connects the first or second instance to the instances extracted from the first or second class depending on their relationship and generates at least one first or second instance path.

17. The apparatus of claim 10, wherein if a path search condition including at least one of an instance path length, a number of results derived, and a response time is input together with the keywords, the instance path search unit searches for an instance path based on the path search condition.

* * * * *